(12) United States Patent
Honda

(10) Patent No.: US 6,181,878 B1
(45) Date of Patent: *Jan. 30, 2001

(54) IMAGE CAPTURING APPARATUS CAPABLE OF RECEIVING IDENTIFICATION FROM BASE STATIONS

(75) Inventor: Tsutomu Honda, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/026,672

(22) Filed: Feb. 20, 1998

(30) Foreign Application Priority Data

Feb. 21, 1997 (JP) .................................................. 9-038088

(51) Int. Cl.⁷ .................................................. G03B 17/24
(52) U.S. Cl. ..................... 396/310; 396/429; 348/116; 348/232; 342/357.09
(58) Field of Search .................. 396/310, 319, 396/429; 348/116, 222, 232; 342/357, 357.01, 357.06, 357.09; 358/906, 909.1; 455/66, 456; 340/539, 568.6, 996, 990–995

(56) References Cited

U.S. PATENT DOCUMENTS

| 5,296,884 |   | 3/1994  | Honda et al.     | 396/311 |
|-----------|---|---------|------------------|---------|
| 5,335,072 | * | 8/1994  | Tanaka et al.    | 348/232 |
| 5,506,644 | * | 4/1996  | Suzuki et al.    | 396/319 |
| 5,671,451 | * | 9/1997  | Takahashi et al. | 396/310 |
| 5,842,131 | * | 11/1998 | Yamane           | 455/456 |

* cited by examiner

Primary Examiner—David M Gray
(74) Attorney, Agent, or Firm—Burns, Doane, Swecker & Mathis, LLP

(57) ABSTRACT

A camera includes a place information generator which receives identification information concerning an identification of a radio base station having a predetermined radio transmission zone, and generates place information concerning a place of picking up an image of an object based on received identification information. Generated place information is recorded on a record medium, or is displayed on a display unit. The camera has smaller size and power consumption and excellent portability in addition to recording of photographing place information.

27 Claims, 10 Drawing Sheets

FIG. 3

| | |
|---|---|
| 0 | INLAND (U.S.A) |
| 1 | FOREIGN |
| | |
| | |
| | |
| | |
| | |

TABLE A

| | |
|---|---|
| 0 | NEW YORK |
| 1 | CALIFORNIA |
| 10 | WASHINGTON |
| 11 | ILLINOIS |
| 100 | INDIANA |
| 101 | . |
| | . |

TABLE B

| | |
|---|---|
| 0 | SAN FRANCISCO |
| 1 | SAN JOSE |
| 10 | LOS ANGELES |
| 11 | SAN DIEGO |
| 100 | SANTA ANA |
| 101 | . |
| | . |

TABLE C

| | |
|---|---|
| 0 | LONG BEACH |
| 1 | TORRANCE |
| 10 | COMPTON |
| 11 | BEVERLY HILLS |
| 100 | HOLLYWOOD |
| 101 | . |
| | . |

TABLE D

IMAGE CAPTURING APPARATUS CAPABLE OF RECEIVING IDENTIFICATION FROM BASE STATIONS

This application is based on patent application No. 9-38088 filed in Japan, the contents of which is hereby incorporated by reference.

BACKGROUND OF THE INVENTION

This invention relates to an image capturing apparatus capable of recording a captured image together with information about an image capturing place and the like.

In recent years, car navigation systems having a built-in GPS (Global Positioning System) have been commercially available.

Also, there have been proposed a variety of public radio communications systems, such as mobile telephone system, personal handyphone system (PHS). These public radio communications systems have different zone areas which respective radio transmission base stations of the systems can cover. For example, the mobile telephone system has a large radio area, such as the size of a city. This system is called a large area radio communication system or LARCS. The personal handyphone system has a small radio area, such as the size of a block of a city. This system is called a small area radio communications system or SARCS.

U.S. Pat. No. 5,296,884 discloses a camera provided with a position detector adopting GPS. This camera has an advantage of specifying a place of photographing by the built-in GPS receiver. However, the camera having the built-in GPS receiver has a larger size and consumes a large amount of power, which necessitates mounting of a heavy battery. This reduces the degree of portability.

Further, there has been proposed a search system adopting the PHS, specifically a wandering aged man search system. According to this search system, an aged man having a wandering habit is equipped with a terminal of the PHS and his position is confirmed by receiving radio signals from a base station of the PHS.

However, these technologies utilizing the GPS and the public radio communications systems, the camera having the built-in GPS receiver and the wandering aged man search system adopting the PHS have not yet fulfilled the strong demand of an image capturing apparatus having small size, small power consumption, excellent portability, and recording of image capture place information.

SUMMARY OF THE INVENTION

It is an object of the present invention to provide an image capturing apparatus which has overcome the problems residing in the prior art.

According to an aspect of the present invention, an image capturing apparatus comprises: an image pickup device which picks up an optical image of an object; and a place information generator which receives identification information concerning an identification of a radio base station having a predetermined radio transmission zone, and generates place information concerning a place of picking up an image of an object based on received identification information.

According to another aspect of the present invention, an image capturing apparatus comprises: an image pickup device which picks up an optical image of an object; a receiver unit which receives electromagnetic waves including a signal representative of identification information concerning an identification of a radio base station having a predetermined radio transmission zone; a detector which detects identification information from received electromagnetic waves; a storage unit which stores place data related to identification information of the radio base station; and an output unit which outputs place information concerning a place of picking up an optical image of an object based on detected identification information and place data stored in the storage unit.

According to another aspect of the present invention, an image capturing apparatus connectable with a receiver unit which receives electromagnetic waves including a signal representative of identification information concerning an identification of a radio base station having a predetermined radio transmission zone, the image capturing apparatus comprising: an image pickup device which picks up an optical image of an object; a detector which detects identification information from received electromagnetic waves; a storage unit which stores place data related to identification information of the radio base station; and an output unit which outputs place information concerning a place of picking up an optical image of an object based on detected identification information and place data stored in the storage unit.

According to another aspect of the present invention, a method for generating information concerning a place of picking up an image of an object, the method comprising the steps of: receiving identification information concerning an identification of a radio base station having a predetermined radio transmission zone; and generating place information concerning a place of picking up an image of an object based on received identification information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is tables showing a filing system of place information;

DETAILED DESCRIPTION OF THE PREFERRED EMBODIMENTS OF THE INVENTION

Figure 1:
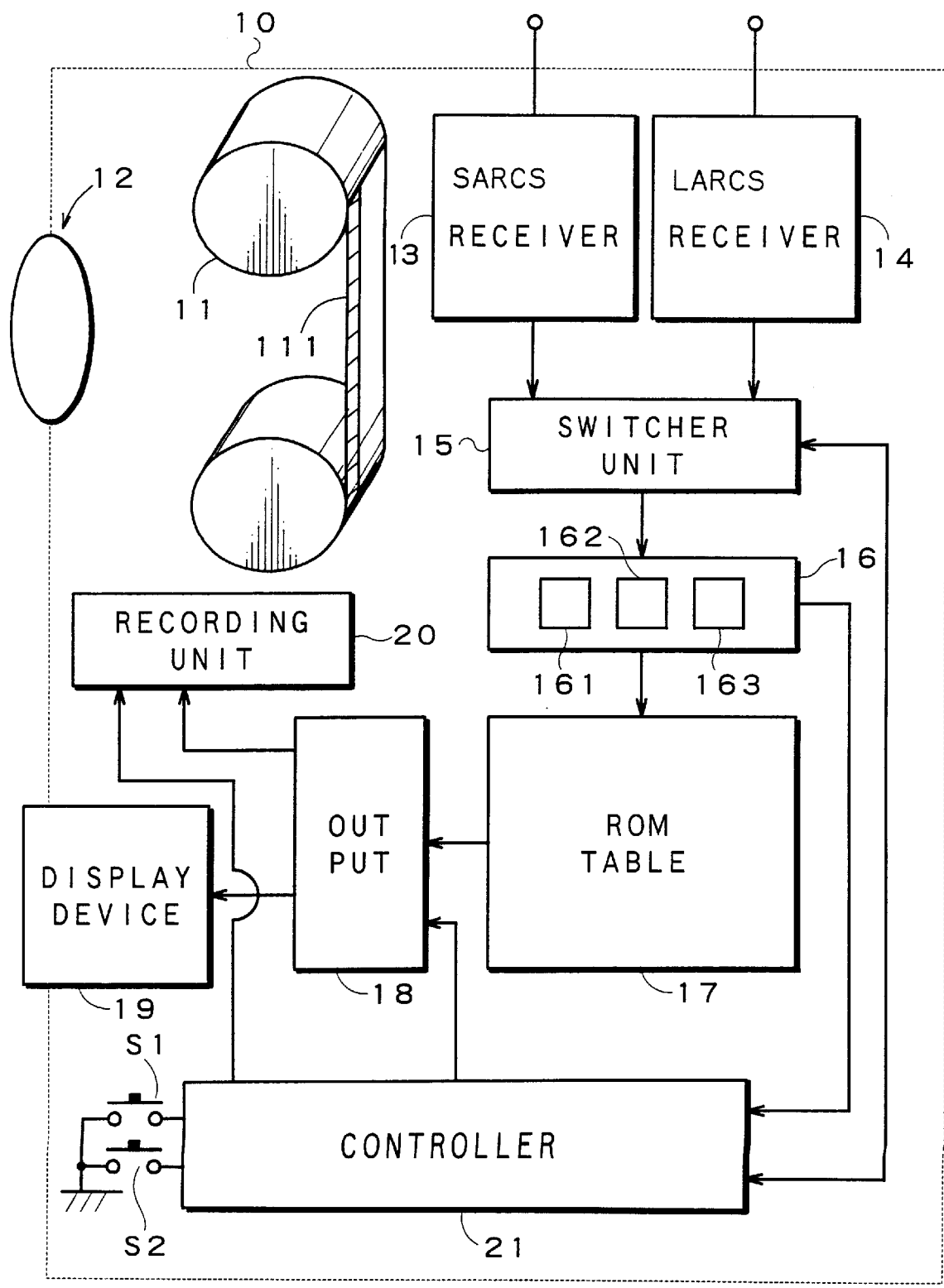
FIG. 1 is a schematic diagram showing a construction of a camera according to a first embodiment of the invention.

A first embodiment of the invention will be described with reference to FIGS. 1 to 7. Indicated at 10 is a camera 10 according to this embodiment. An image of an object is picked up in a silver-halide photography system. A silver-halide film 11 loaded in the camera 10 is formed with a magnetic recording area 111 in an end portion. Information is magnetically recorded in this magnetic recording area 111. A lens 12 made of a plurality of lenses is adapted to focus an optical image of an object on the silver-halide film 11 during the photographing. In this way, an optical image of an object is picked up.

A receiver 13 is a dipole antenna for receiving radio signals coming from base stations of a small area radio communications system or SARCS of a public radio communications system. Hereafter, description is to be made, assuming that the SARCS receiver 13 receives radio signals coming from base stations of SARCS.

A receiver 14 is a dipole antenna for receiving radios of large output coming from base stations of a large area radio communications system or LARCS of a public radio communications system. A switcher unit 15 is adapted to connect the SARCS receiver 13 or the LARCS 14 with a detecting unit 16.

The detecting unit 16 includes a discriminator 161 for discriminating based on a predetermined reference voltage whether the reception of radio by the receiver 13 or 14 is satisfactory, a demodulator 162 for demodulating a signal received by the receiver 13 or 14 connected therewith via the switcher unit 15 by detecting it, and an identification information detector 163 for detecting identification of a base station which is included in the demodulated signal and represents a transmission end.

The discriminator 161 compares the voltage of the radio signal received by the receiver 13 or 14 with the predetermined reference voltage and determines that the reception of radio signal is satisfactory if the received voltage is the reference voltage or higher while determining that the reception of radio is unsatisfactory unless otherwise indicated. The discrimination method is not limited to the above, but may be as follows. A gain of the receiver is calibrated by the predetermined reference voltage and substitutably measured by an attenuator. In other words, the discriminator 161 can discriminate whether the reception of the radio signal being received by the receiver 13 or 14 is satisfactory based on the predetermined reference voltage or current without specifying any particular method.

Zones where radio signals coming from respective base stations of the SARCS and the LARCS are described with reference to FIG. 2. Circles "A", "B", "C", "D", E"E", "F" drawn in thin line represent zones where the camera 10 can receive radio signals coming from base stations of the LARCS located in vicinity of the centers of the respective thin line circles. Circles drawn in bold line represent zones where the camera 10 can receive radio signals coming from base stations of the SARCS located in vicinity of the centers of the bold line circles. In the case of the SARCS, the place information allotted to the identification information of the base station is detailed since the zones of each base station is small. However, as shown in FIG. 2, the service zone of the SARCS (area enclosed by all bold lines is limited to a specified zone (generally, main city) which) is smaller than that of the LARCS (AUBUCUDUEUF).

Figure 2:
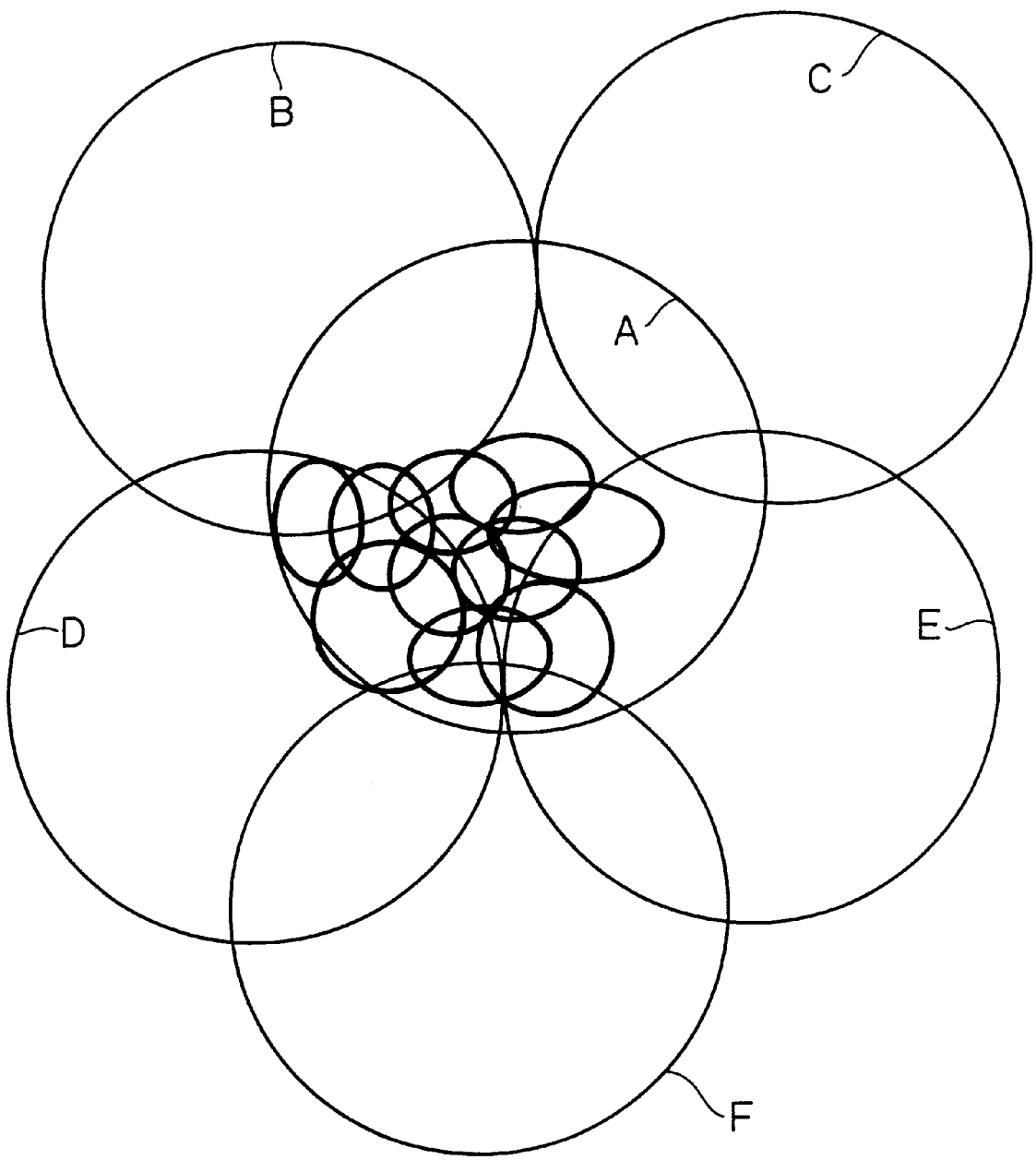
FIG. 2 is a diagram showing receivable zones of radios coming from respective base stations of SARCS and LARCS.

In FIG. 2, if the camera 10 is, for example, not located within the service zone of the SARCS, the detecting unit 16 determines that the reception is unsatisfactory. However, if the camera 10 is within the service zone of the LARCS in this case, although the place information to be detected is less detailed than the one obtained according to the SARCS, the place information allotted to the identification information of the base station of the LARCS is displayed in a display device 19. In this embodiment, a controller 21 performs a control of preferentially selecting a more detailed place information and obtaining a less detailed place information even in the case that the detailed place information cannot be obtained.

Referring back to FIG. 1, a ROM table 17 is a memory for storing the identification information of the respective base stations of the SARCS and the LARCS and the place information of the base stations to which the identification information are allotted while relating them in the form of a table. For example, if the identification information is allotted to the base station placed in "Hollywood, Los Angeles", the ROM table 17 stores the place information "Los Angeles", "Hollywood" together with the identification information.

The place information is described in detail with reference to FIG. 3 showing a filing system of place information. Table B comprised of a plurality of elements is allotted to each element of Table A serving as a parent; Table C comprised of a plurality of elements is allotted to each element of Table B; and Table D comprised of a plurality of elements is allotted to each element of Table C. The most significant bit in Table A represents inland (U.S.A.) or foreign countries. The subsequent six bits in Table B represent states, such as "New York", "California", and "Washington". The subsequent six bits in Table C represent cities and counties. The least significant three bits represent towns and places of interest. The place information according to this embodiment is comprised of a 16-bit-data in which any one element included in each table of the hierarchical filing system is connected with each other. In the case that the reception of radio of the LARCS is satisfactory, but the reception of radio of the SARCS is not satisfactory, the least significant three bits are 0.

Referring back to FIG. 1, an output unit 18 reads the place information of the base station to which the identification information detected by the identification information detector 163 of the detecting unit 16 is allotted from the ROM table 17, and sends it to the display device 19. The output unit 18 also codes this place information and sends the coded place information to a magnetic recording unit 20.

The receivers 13, 14, the switcher unit 15, the detecting unit 16, the ROM table 17, and the output unit 18 constitutes a place information generator.

The display device 19 is a liquid crystal display panel or the like for displaying place information sent from the output unit 18.

Figure 4:
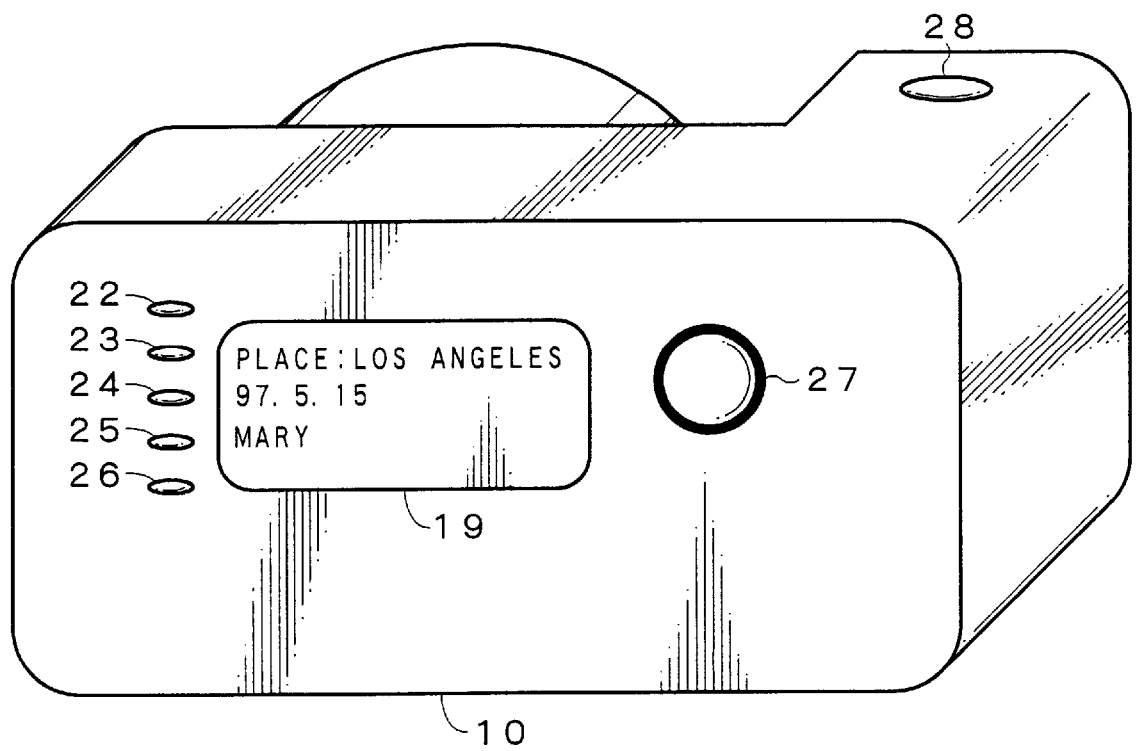
FIG. 4 is a perspective view showing an external appearance of the camera, particularly showing an exemplary display of place information on a display device of the camera.

The display made in the display device is described with reference to FIG. 4 showing a display example. The place and date of photographing are displayed in this order from above in the display device 19 provided in the rear surface of the camera 10. A date data of a built-in clock is displayed as a date. It is also possible to manually input the name of an object, e.g., person's name "Mary" in FIG. 4. In this embodiment, initialization is made such that the name of place in Table C is constantly displayed even in the case that the camera 10 is located within the service zone of the SARCS.

A mechanism for changing the name of place displayed by the initialization is described with reference to FIGS. 4 and 5. With reference to FIG. 4, description is made on a case where the camera 10 is located in "Hollywood, Los Angeles" which is within the service zones of the SARCS and the LARCS. In this case, "Los Angeles" corresponding to Table C is normally displayed in the right column of the "Place of Photographing" of the display device 19. If, for example, a button 22 is pressed at this time, the display in the right column of the "Place of Photographing" of the display device 19 is changed from "Los Angeles" specified by the LARCS to "Hollywood" specified by the SARCS.

Figure 5:
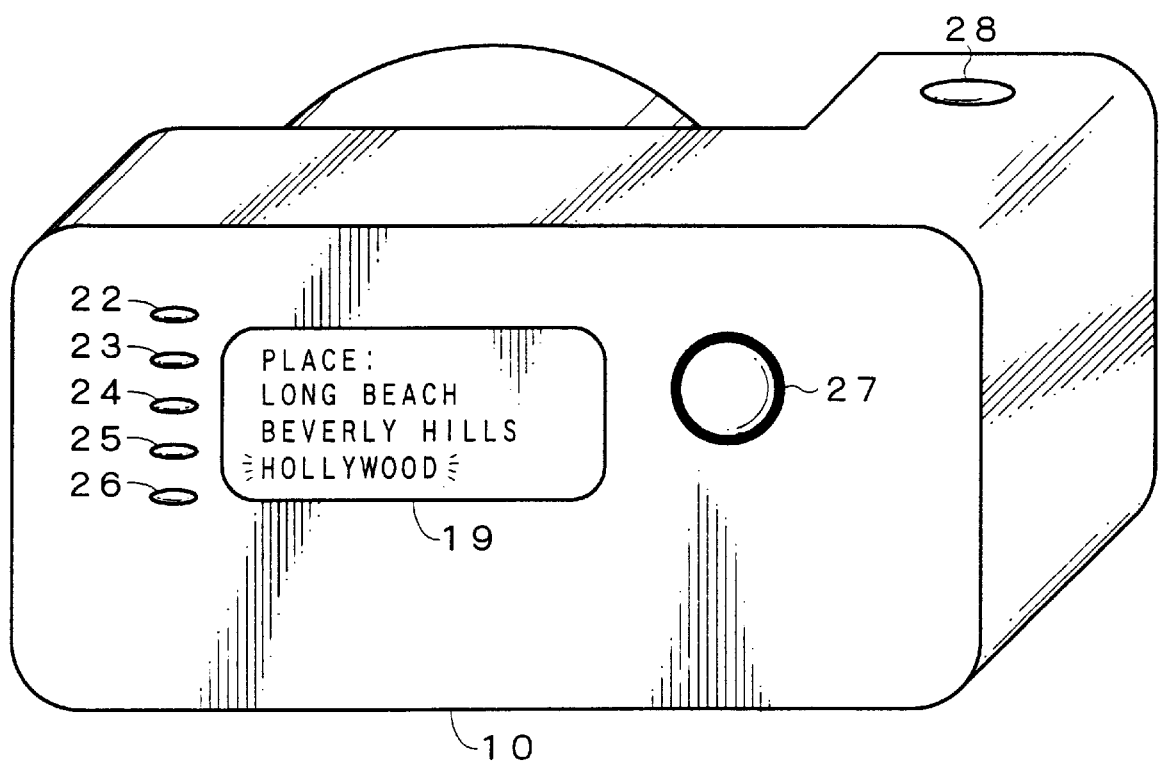
FIG. 5 is a perspective view of the camera, showing another exemplary display of place information on the display device.

If the camera 10 is located indoor or like place where the reception of radio of the LARCS is satisfactory, but the reception of radio of the SARCS is not, if a camera operator wishes to select the name of place corresponding to Table D, or if a landscape in the distance is being photographed with a telephoto lens, three names of place are displayed as candidates below the "Place of Photographing" as shown in FIG. 5 by pressing a button 26. By turning a dial 27, these three names of place are changed to another names of place detected from Table D according to its rotating direction and rotating amount. If the dial 27 is turned clockwise, the next candidate is displayed in the display device 19. On the other hand, if the dial 27 is turned counterclockwise, the previous candidate is displayed in the display device 19. If the intended name of place is found among the three names of place displayed in the display device 19, it can be selected by pressing the corresponding one of the buttons 23 to 25. In other words, the uppermost name of place is selected if the button 23 is pressed; the middle name of place is selected if the button 24 is pressed; and the bottommost name of place is selected if the button 25 is pressed.

Also in the case that the camera 10 is located in a position where a plurality of the SARCS's zones, e.g., three SARCS's zones overlap, three names of place corresponding to the reception zones are displayed below the "Place of Photographing" and are selectable by the buttons 23 to 25. If there are two overlapping reception zones, two names of place are displayed. In the case of four or more overlapping reception zones, only three of the names of place corresponding thereto are displayed and the remaining one(s) is/are displayed according to the rotation of the dial 27 so that a desired name of place can be selected.

Referring back to FIG. 1, the magnetic recording unit 20 is adapted to record the coded place information sent from the output unit 18 in the magnetic recording area 111 of the silver-halide film 11.

The controller 21 including a microprocessor is adapted for controlling the overall operation of the camera 10. For example, if the reception of radio by the SARCS receiver 13 is discriminated to be unsatisfactory by the discriminator 161, the controller 21 sends a switch control signal to the switcher unit 15 in order to connect the LARCS receiver 14, instead of the SARCS receiver 13, with the detecting unit 16. The controller 21 also controls the writing of the magnetic recording unit 20. A switch S1 is turned on when a shutter release button 28 is pressed down a half stroke, and a switch S2 is turned on when the shutter release button 28 is pressed down a full stroke.

Next, an operation sequence of the camera is described with reference to FIG. 6.

When the camera 10 is electrically turned on (Step #1), it is discriminated whether the switch S1 is turned on (Step #5). When the shutter release button 28 is partly pressed, photographing preparation is performed. If the switch S1 is off, the controller 21 discriminates whether the camera 10 has been electrically turned off (Step #70). If the camera 10 is electrically off, the controller 21 enters a power consumption reduction mode, thereby being brought into a sleep state where only specific operations to the controller 21 are being detected (Step #75). On the other hand, this routine returns to Step #5 unless the camera 10 is electrically off.

If the switch S1 is discriminated to be on in Step #5, power is supplied to the SARCS receiver 13, the switcher unit 15 and the detecting unit 16, thereby activating the SARCS receiver (Step #10). Since no power is supplied to the SARCS receiver unless the switch S1 is turned on, the power consumption can be reduced. Subsequently, the discriminator 161 of the detecting unit 16 discriminates based on the predetermined voltage (sensitivity level) set in advance whether a radio signal is satisfactorily being received by the SARCS receiver 13 (Step #15).

If the reception is satisfactory, the identification information detector 163 of the detecting unit 16 decodes the signal received by the SARCS receiver 13 and detects the identification information of the base station of the SARCS as a transmitting end from the decoded signal. The place information corresponding to the detected identification information is read from the ROM table 17. The output unit 18 sends the place information read from the ROM table 17 to the display device 19, causing the display device 19 to display the place information allotted to the identification information of the SARCS's base station (Step #30). However, in this case, the name of place corresponding to Table C of FIG. 3 is displayed by the initialization. It should be noted that, if pieces of the identification information of a plurality of, e.g., three SARCS's base stations can be detected, the identification information detector 163 detect them all. Alternatively, the identification information detector 163 may detect only the identification information included in the radio signal whose reception is most satisfactory.

Conversely, unless the reception is satisfactory, the switch control signal is sent to the switcher unit 15 to switch the SARCS receiver 13 to the LARCS receiver 14. The LARCS receiver 14 is activated (Step #20). The discriminator 161 of the detecting unit 16 then discriminates whether the reception of radio signals by the LARCS receiver 14 is satisfactory (Step #25).

The identification information detector 163 of the detecting unit 16 decodes the signal received by the LARCS receiver 14 if the reception of radio signals by the LARCS receiver 14 is satisfactory, and detects the identification information of the base station of the LARCS as a transmitting end from this decoded signal. The place information corresponding to the detected identification information is read from the ROM table 17. The output unit 18 sends the place information read from the ROM table 17 to the display device 19, causing the display device 19 to display the place information allotted to the identification information of the base station of the LARCS (Step #30).

On the other hand, unless the reception of radio signals by the LARCS receiver 14 is satisfactory, the detecting unit 16 notifies the controller 21 of it. Upon the receipt of this notification, the controller 21 draws the camera operator's attention by, for example, blinking the characters under the "Place of Photographing" shown in FIG. 4 in order to notify him/her that the place of photographing cannot be specified (Step #35).

After the procedure of Steps #1 to #30, the name of place corresponding to Table C of FIG. 3 is displayed in the display device 19 by the initialization. At this time, if the button 26 shown in FIG. 5 is pressed as described above (Step #40), a display switch mode is entered (Step #45), thereby enabling the camera operator to select a desired name of place from the Table D (or Table C initially set). Upon the completion of this display switching operation, this routine proceeds to Step #50. Even if the button 26 is not pressed, this routine also proceeds to Step #50.

In this state, it is discriminated whether the switch S2 has been turned on by fully pressing the shutter release button 28 (Step #50). If the switch S2 is off, this routine proceeds to Step #70.

If the switch S2 is on, an image pickup operation is performed and an optical image of an object is recorded in the silver-halide film 11 (Step #55). Upon the completion of the photographing, the controller 21 sends a write signal to the magnetic recording unit 20 and causes the silver-halide film 11 to be fed. Thereby, the magnetic recording unit 20 magnetically records the signal in which the place information confirmed in Step #30 or #45 is encoded together with the date information and the object information in the magnetic recording area 111 of the silver-halide film 11 being fed (Step #60).

Thereafter, the controller 21 stops the supply of power to the SARCS receiver which started in Step #10 or that to the LARCS which started in Step #20, thereby stopping the operation of the SARCS receiver or the LARCS receiver (Step #65). As a result, power consumption can be reduced. Then, this routine proceeds to Step #70.

According to the embodiment described above, the name of the place displayed in the display device 19 can be printed in a bottom right portion of a picture as a date.

In this embodiment, the SARCS receiver or the LARCS receiver is activated when the switch S1 is turned on. However, they may be activated by a switch which is separately provided from the switch S1. In this case, the place information confirmed by this operation may be held until a next operation is started and the place information is newly measured.

Further, the reception of SARCS's radio signal is unsatisfactory, 0 is written in the least significant 3 bits of the measured place information. If a desired name of the place is selected in Step #45, a code corresponding to the selected table D is written in these bits.

In this embodiment, the camera 10 is initialized such that the name of the place corresponding to Table C of FIG. 3 is displayed. However, if the camera 10 is located within the service zone of the SARCS, the name of the place corresponding to Table D may be detected from the 16-bit place information specified by the identification information of the SARCS's base station and the detected name of the place may be displayed in the display device 19. Further, if the camera 10 is located within the service zone of the LARCS although outside the service zone of the SARCS, the name of the place corresponding to Table C may be detected from the 16-bit place information specified by the identification information of the base station of the LARCS and the detected name of the place may be displayed in the display device 19.

Although the SARCS and LARCS receivers 13, 14 are both a dipole antenna in this embodiment, they may be a different kind of antenna or may be provided with a receiving circuit including a demodulating circuit, respectively. In this case, the switcher unit 15 may compare the signals demodulated from the radios received by the respective receivers 13, 14 and select the signal having been received better, and the detecting unit 16 may detect the identification information of the base station from the signal selected by the switcher unit 15. Alternatively, a signal receiving antenna may be commonly used as the receivers 13, 14.

Further, although the camera 10 is provided with the two receivers 13, 14 in this embodiment, it may be provided receivers corresponding to three or more kinds of radiophone systems in conformity with radio signals to be received.

Although the detecting unit 16 is provided with the discriminator 161 in this embodiment, it may not necessarily be provided therewith. Specifically, in the initial state, the SARCS receiver 13 and the detecting unit 16 are connected, and the demodulator 162 demodulates the signal received by the SARCS receiver 13 by detecting it. The identification information detector 163 detects the identification information of the base station as a transmitting end which is included in the demodulated signal. In this case, if the identification information cannot be detected, the identification information detector 163 may notify the switcher unit 15 or the controller 21 of it and the switcher unit 15 may connect the LARCS receiver 14, instead of the SARCS receiver 13, with the detecting unit 16 in response to this notification. Alternatively, in the case that a bit error rate during the detection of the identification information is higher than a predetermined bit error rate, the identification information detector 163 may notify the switcher unit 15 or the controller 21 of it and the switcher unit 15 may connect the LARCS receiver 14, instead of the SARCS receiver 13, with the detecting unit 16.

Figure 6:
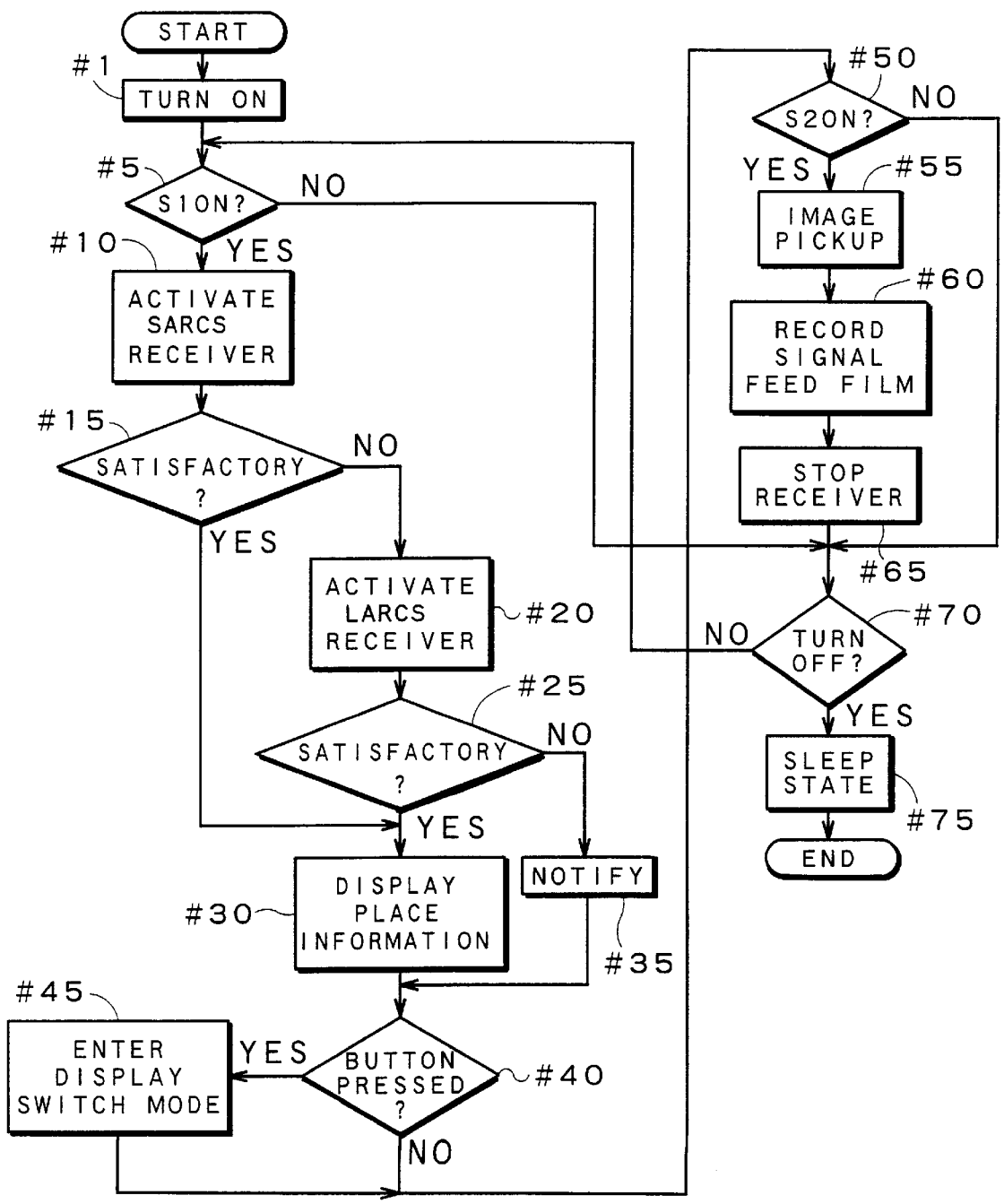
FIG. 6 is a flowchart showing an operation sequence of the camera.
Figure 7:
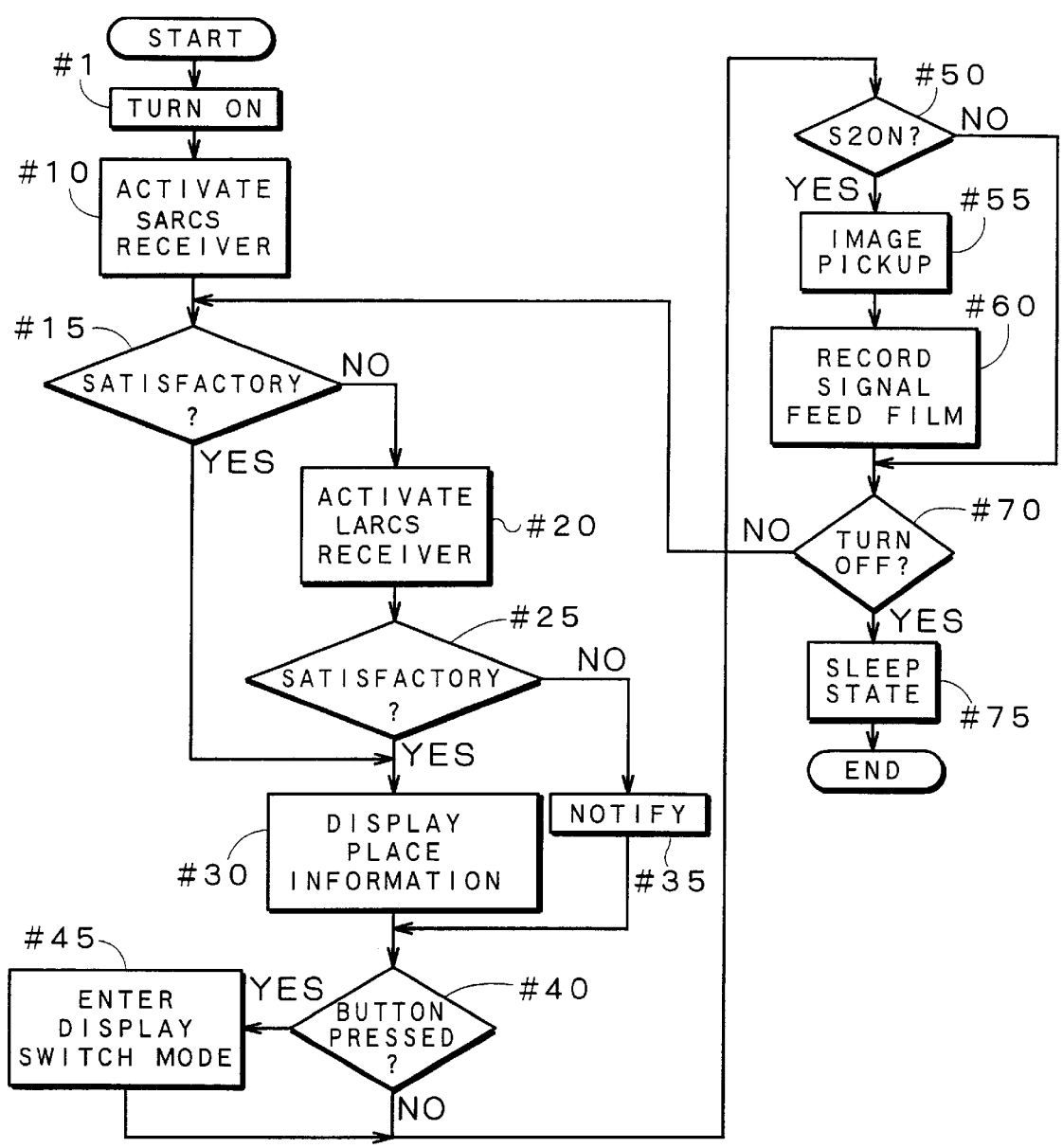
FIG. 7 is a flowchart showing another operation sequence of the camera.

Further, although the controller 21 operates in accordance with the flowchart of FIG. 6 in this embodiment, it may operate in accordance with a flowchart of FIG. 7. The flowchart of FIG. 7 differs from that of FIG. 6 in that Steps #5 and #65 are deleted. In FIG. 7, when the camera 10 is electrically turned on, power is immediately supplied to the SARCS receiver, activating it. The operation can be simplified since the operation of specifying the place of photographing is started only by electrically turning the camera 10 on. Step #65 of FIG. 6 is also deleted and, accordingly, either the SARCS receiver or the LARCS receiver is constantly activated while the camera 10 is electrically on. In other words, FIG. 6 is a flowchart laying stress on the power consumption, whereas FIG. 7 is a flowchart laying stress on the simpler operation.

Figure 8:
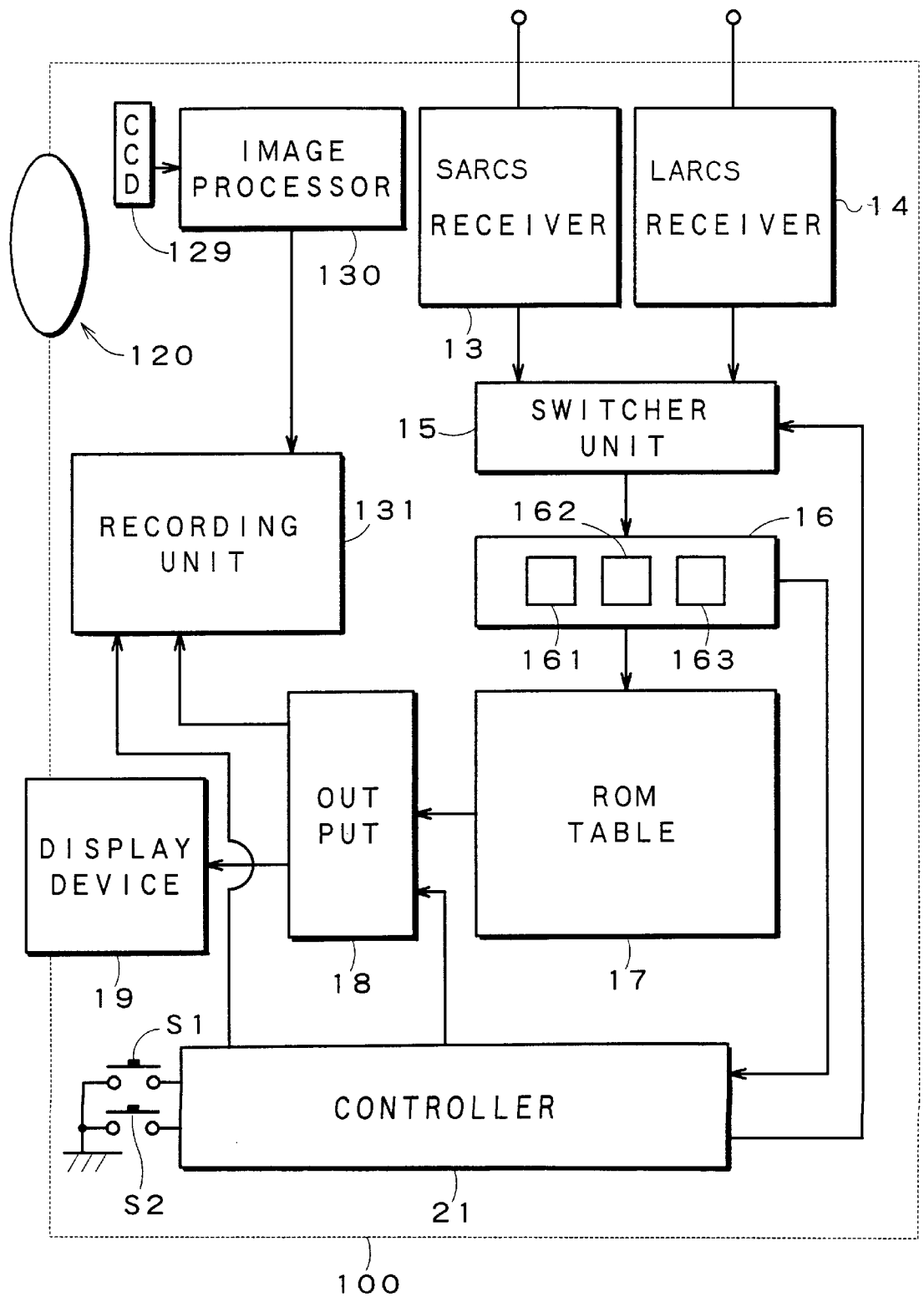
FIG. 8 is a schematic diagram showing a construction of a camera according to a second embodiment of the invention.

A second embodiment of the invention is described with reference to FIG. 8. No description is given on elements similar to the first embodiment by identifying them by the same reference numerals, and only elements different from the first embodiment are described. The image pickup unit of a camera 100 according to the second embodiment is an electronic recording system adopted by a video camera, an electronic camera or the like.

A lens 120 is a group of lenses for focusing an optical image of an object on a CCD 129. The CCD 129 is a CCD sensor for photoelectrically converting the optical image focused on the sensing surface thereof into an image signal. An image processor 130 is a circuit which applies a specified analog processing (signal amplification, offset adjustment, etc.) to the image signal obtained by the photoelectric conversion, thereby converting respective pixel signals included in the image signal into digital values or pixel data, and then applies a specified digital processing (gradation correction adopting the black level correction, white level correction, LUP (look-up table), and image compression such as MPEG or JPEG) to the respective pixel data. The lens 120, the CCD 129 and the image processor 130 function as an image pickup unit for sensing an optical image.

A recording unit 131 writes in and reads information from a magnetic tape, magnetic or photomagnetic disk, semiconductor storage device such as a RAM or memory card, or like storage medium. The image signal processed by the image processor 130 is stored in a storage medium by the recording unit 131 together with encoded place information sent from the output unit 18, date information, object information and the like.

Figure 9:
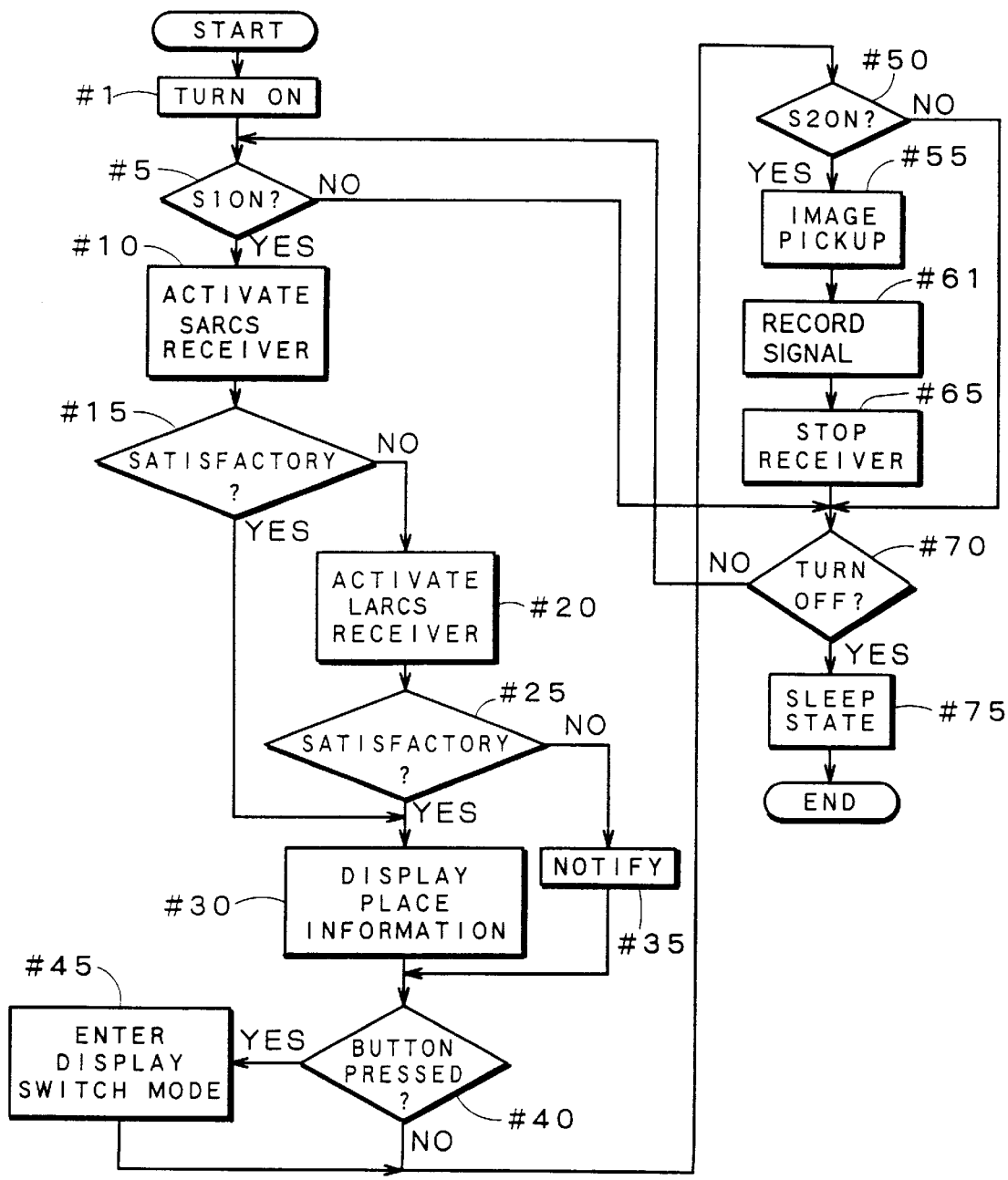
FIG. 9 is a flowchart showing an operation sequence of the camera of the second embodiment.

Next, an operation sequence of the second embodiment is described with reference to a flowchart shown in FIG. 9. The camera 100 operates substantially in the same procedure as the flowchart of FIG. 6. Hereafter, points different from the first embodiment are described.

If the switch S2 is on in Step #55, the CCD 129 photoelectrically converts an optical image focused on its sensing surface into an image signal. The image processor 130 applies the specified analog processing (signal amplification, offset adjustment, etc.) to the image signal obtained by the photoelectric conversion, thereby converting respective pixel signals included in the image signal into digital values (pixel data), and then applies a specified digital processing (gradation correction adopting the black level correction, white level correction, LUP (look-up table), and image compression such as MPEG or JPEG) to the respective pixel data. In this way, the optical image focused on the CCD 129 is picked up. Simultaneously, the output unit 18 encodes the place information confirmed in Step #30 or #45 together with other pieces of information such as date information and object information.

Subsequently, the recording unit 131 records the image information processed by the image processor 130 and the pieces of encoded information sent from the output unit 18 in the storage medium (Step #61).

Although the image processor 130 and the recording unit 131 convert the image signal obtained by the CCD 129 into a digital image signal and records it, respectively, in the second embodiment, an analog image signal may be recorded.

Figure 10:
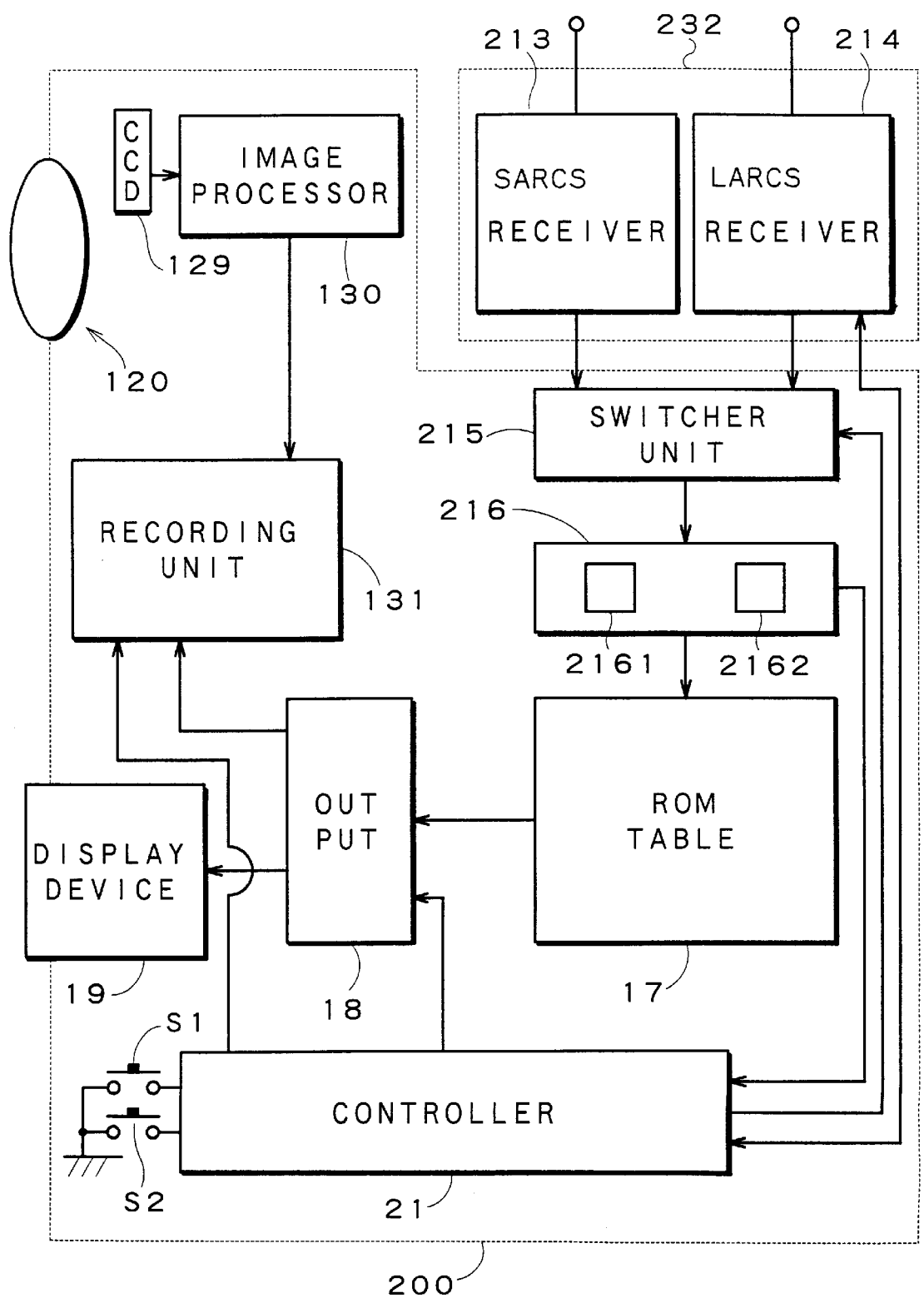
FIG. 10 is a schematic diagram showing a construction of a camera according to a third embodiment of the invention.

A third embodiment of the invention is described with reference to FIG. 10. No description is given on elements similar to the second embodiment by identifying them by the same reference numerals, and only elements different from the second embodiment are described. A radio telephone 232 has SARCS and LARCS receivers 213, 214 and is singly capable of communication. The radio telephone 232 is detachably mounted on a camera 200. The SARCS receiver 213 has a dipole antenna for receiving radio signals coming from base stations of the SARCS and a demodulating circuit for demodulating signals received by this dipole antenna. The receiver 214 has a dipole antenna for receiving radio signals coming from the base stations of the LARCS and a demodulating circuit for demodulating signals received by this dipole antenna. With the controller 21 is connected a control line for controlling the radio telephone 232. Accordingly, the controller 21 can, for example, electrically turn the radio telephone 232 on and off.

A switcher unit 215 is a switch circuit which includes a first input terminal for receiving an input signal for the SARCS, a second input terminal for receiving an input signal for the LARCS and an output terminal and sends out the input signal received via the first or second input terminal from the output terminal in accordance with a control signal from the controller 21. When the first input terminal is connected an output of the SARCS receiver 213 of the radio telephone 232 is received. When the second input terminal is connected, an output of the LARCS receiver 214 of the radio telephone 232 is received. A detecting unit 216 includes a discriminator 2161 for discriminating whether the reception of the input signal being sent from the output terminal of the switcher unit 215 is satisfactory by comparing it with a specified signal and an identification information detector 2162 for detecting identification information of the base station as a transmitting end from the input signal. Parts of the SARCS receiver 213 which can be shared with a receiver used for the telephone conversation are maximally increased to reduce the cost of the SARCS receiver 213 by reducing the parts thereof.

Next, an operation sequence of the third embodiment is described. The camera 200 operates substantially in the same procedure as the flowchart of FIG. 9 adopted in the second embodiment. Hereafter, points different from the second embodiment are described.

If the switch S1 is discriminated to be on in Step #5, the controller 21 electrically turns the radio telephone 232 on and sends a switch signal to the switcher unit 215 to connect the SARCS receiver 213 with the detecting unit 216, thereby activating the SARCS receiver 213 (Step #10). Subsequently, the discriminator 2161 of the detecting unit 216 discriminates based on, for example, a predetermined reference voltage (sensitivity level) whether the reception of radio being received by the SARCS receiver 213 is satisfactory (Step #15).

If the reception is satisfactory, the identification information detector 2162 of the detecting unit 216 detects the identification information of the base station of the SARCS as a transmitting end from the signal received by the SARCS receiver 213. The place information corresponding to the detected identification information is read from the ROM table 17. The output unit 18 sends the place information read from the ROM table 17 to the display device 19, causing the display device 19 to display the place information allotted to the identification information of the SARCS's base station (Step #30).

Conversely, unless the reception is satisfactory, the switch signal is sent to the switcher unit 215 to connect the LARCS receiver 214 with the detecting unit 216, thereby activating the LARCS receiver 214 (Step #20). The discriminator 2161 of the detecting unit 216 discriminates whether the reception of the radio signals being received by the LARCS receiver 214 is satisfactory (Step #25).

If the reception of the radio signals being received by the LARCS receiver 214 is satisfactory, the identification information detector 2162 of the detecting unit 216 demodulates the signal received by the LARCS receiver 214 and detects the identification information of the base station of the LARCS as a transmitting end from the demodulated signal. The place information corresponding to the detected identification information is read from the ROM table 17. The output unit 18 sends the place information read from the ROM table 17 to the display device 19, causing the display device 19 to display the place information allotted to the identification information of the base station of the LARCS (Step #30). The subsequent operations are similar to those of the second embodiment.

The camera as a main body and the radio telephone may be assembled into a single unit. In this case, the radio telephone may be electrically turned on when the switch S1 is turned on or a power switch therefor may be separately provided. Further, while the radio telephone is electrically on, the place information may be constantly displayed. Furthermore, when the radio telephone is electrically off, it may be electrically turned on by turning the switch S1 on.

As is clear from the above, according to the invention, there can be obtained the image capturing apparatus which has a smaller size, less power consumption and a good portability and can specify the place of photographing.

Although the present invention has been fully described by way of example with reference to the accompanying drawings, it is to be understood that various changes and modifications will be apparent to those skilled in the art.

Therefore, unless otherwise such changes and modifications depart from the scope of the present invention, they should be construed as being included therein.

What is claimed is:

1. An image capturing apparatus comprising:
   an image pickup device which picks up an optical image of an object; and
   a place information generator which receives identification information concerning identification of each of a plurality of radio base stations having different radio transmission zones, and which generates place information respectively corresponding to the plurality of identification information, wherein the place information generator discriminates whether receivers of the plurality of identification information have a satisfactory signal, and generates the place information based on the identification information of the receiver that has been discriminated to have the satisfactory signal.

2. An image capturing apparatus according to claim 1, wherein the base station sends electromagnetic waves for radio communications, the electromagnetic waves including a signal indicative of identification information of the base station, and the place information generator includes a receiver which receives the electromagnetic waves.

3. An image capturing apparatus according to claim 2, wherein the receiver includes a radio telephone.

4. An image capturing apparatus according to claim 1, further comprising a recorder which records on a record medium place information generated by the place information generator.

5. An image capturing apparatus according to claim 1, further comprising a display device which displays place information generated by the place information generator.

6. An image capturing apparatus according to claim 1, wherein said radio base station is a radio communication base station.

7. An image capturing apparatus according to claim 1, further comprising a display device which displays the plurality of place information.

8. An image capturing apparatus according to claim 1, wherein the place information generator includes a receiver which receives identification information, further comprising:
   a discriminator which discriminates whether reception of identification information by the receiver is satisfactory; and
   a display device which displays a reception state of the receiver.

9. An image capturing apparatus according to claim 1 which is an electronic camera.

10. An image capturing apparatus according to claim 1, wherein the place information generator includes:
    a first receiver which receives first identification information concerning identification of a first radio base station having a first predetermined radio transmission zone; and
    a second receiver which receives second identification information concerning identification of a second radio base station having a second predetermined radio transmission zone smaller than the first predetermined radio transmission zone.

11. An image capturing apparatus according to claim 10, wherein the place information generator further includes:
    a discriminator which discriminates whether reception of first identification information by the first receiver and reception of second identification information by the second receiver are respectively satisfactory; and
    a controller which controls generation of first place information based on first identification information and generation of second place information based on second identification information in accordance with respective reception states of the first and second receivers.

12. An image capturing apparatus according to claim 11, further comprising a display device which displays a reception state of the first and second receivers.

13. An image capturing apparatus according to claim 10, further comprising a recorder which records on a record medium first and/or second place information generated by the place information generator.

14. An image capturing apparatus according to claim 10, further comprising a display device which displays first and/or second place information generated by the place information generator.

15. An image capturing apparatus comprising:
    an image pickup device which picks up an optical image of an object;
    a receiver unit which receives electromagnetic waves including signals representative of identification information concerning an identification of a each of a plurality of radio base stations having different predetermined radio transmission zones;
    a detector which detects identification information from received electromagnetic waves;
    a storage unit which stores place data and identification information of the radio base stations; and
    an output unit which outputs place information concerning a place of picking up an optical image of an object based on detected identification information and place data stored in the storage unit.

16. An image capturing apparatus according to claim 15, wherein the receiver unit includes:
    a first receiver which receives first identification information concerning an identification of a first radio base station having a first predetermined radio transmission zone; and
    a second receiver which receives second identification information concerning an identification of a second radio base station having a second predetermined radio transmission zone smaller than the first predetermined radio transmission zone.

17. An image capturing apparatus according to claim 16, further comprising:
    a discriminator which discriminates whether reception of first identification information by the first receiver and reception of second identification information by the second receiver are respectively satisfactory; and
    a controller which controls the output unit to output first place information based on first identification information and second place information based on second identification information in accordance with respective reception states of the first and second receivers.

18. An image capturing apparatus according to claim 15, further comprising a recorder which records outputted place information on a record medium.

19. An image capturing apparatus according to claim 15, further comprising a display unit which displays outputted place information.

20. An image capturing apparatus connectable with a receiver unit which receives electromagnetic waves including a receiver unit which receives signals concerning an identification of each of a plurality of radio base stations having different transmission zones, the image capturing apparatus comprising:

an image pickup device which picks up an optical image of an object;

a detector which detects identification information from received signals;

a storage unit which stores place data and identification information of the radio base station; and an output unit which outputs place information concerning a place of picking up an optical image of an object based on detected identification information and place data stored in the storage unit.

21. An image capturing apparatus according to claim 20, wherein the receiver unit includes:

a first receiver which receives first identification information concerning an identification of a first radio base station having a first predetermined radio transmission zone; and a second receiver which receives second identification information concerning an identification of a second radio base station having a second predetermined radio transmission zone smaller than the first predetermined radio transmission zone.

22. An image capturing apparatus according to claim 21, further comprising:

a discriminator which discriminates whether reception of first identification information by the first receiver and reception of second identification information by the second receiver are respectively satisfactory; and a controller which controls the output unit to output first place information based on first identification information and second place information based on second identification information in accordance with respective reception states of the first and second receivers.

23. An image capturing apparatus according to claim 20, further comprising a recorder which records outputted place information on a record medium.

24. An image capturing apparatus according to claim 20, further comprising a display unit which displays outputted place information.

25. A method for generating information concerning a place of picking up an image of an object, the method comprising the steps of:

receiving identification information concerning an identification of each of a plurality of radio base stations having different radio transmission zones;

discriminating whether a satisfactory signal is received; and generating place information concerning a place of picking up an image of an object based on received identification information which has been discriminated to have the satisfactory signal.

26. An image capturing apparatus comprising:

an image pickup device which picks up an optical image of an object;

a place information generator which receives identification information concerning identification of each of a plurality of radio base stations having different radio transmission zones, and which generates place information respectively corresponding to the plurality of identification information; and a display device which displays the plurality of place information based on the plurality of identification information.

27. A method for generating information concerning a place of picking up an image of an object, the method comprising the steps of:

receiving identification information concerning an identification of each of a plurality of radio base stations having different radio transmission zones;

generating place information concerning a place of picking up an image of an object based on received identification information; and displaying the plurality of place information based upon the plurality of identification information.

\* \* \* \* \*